P. MAST.
Horse Hay-Rakes.

No. 158,723.  Patented Jan. 12, 1875.

WITNESSES:
E. Wolff
A. F. Terry

INVENTOR:
P. Mast
BY
ATTORNEYS.

UNITED STATES PATENT OFFICE.

PETER MAST, OF WATERVILLE, OHIO.

IMPROVEMENT IN HORSE HAY-RAKES.

Specification forming part of Letters Patent No. 158,723, dated January 12, 1875; application filed November 7, 1874.

*To all whom it may concern:*

Figure 1:
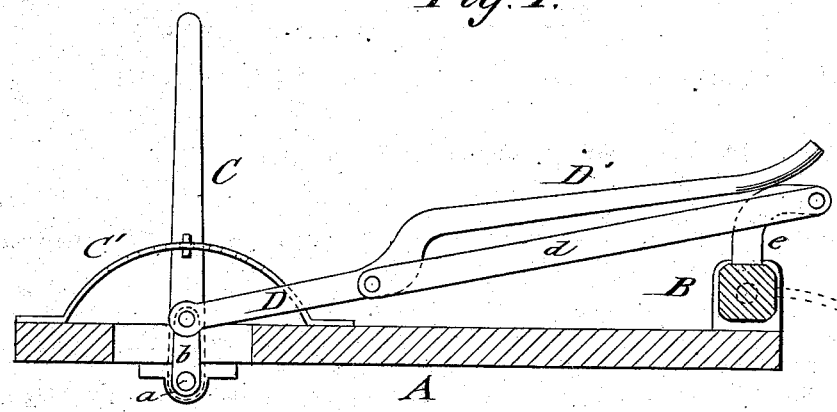
Figure 2:
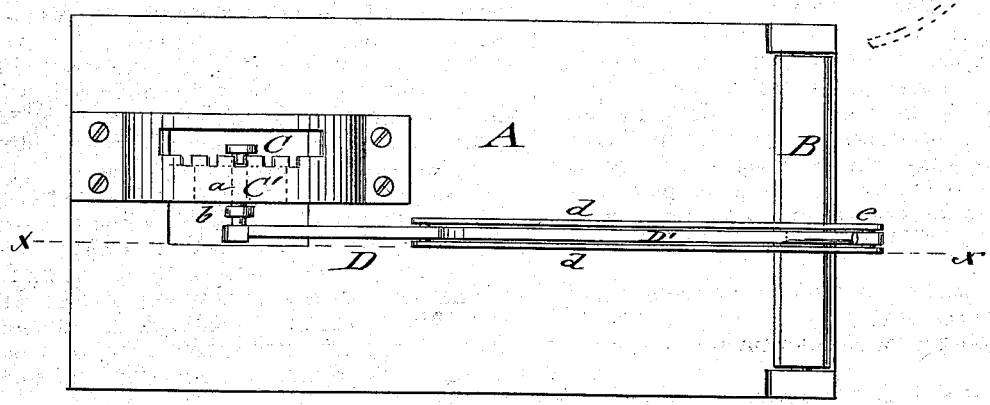

Be it known that I, PETER MAST, of Waterville, in the county of Lucas and State of Ohio, have invented a new and Improved Lever Attachment for Horse Hay-Rakes, of which the following is a specification:

In the accompanying drawing, Figure 1 represents a vertical longitudinal section of my improved lever attachment to horse hay-rakes taken on the line $x\,x$, Fig. 2; and Fig. 2 is a top view of the same.

Similar letters of reference indicate corresponding parts.

The object of my invention is to apply to sulky hay-rakes an improved lever attachment, for the purpose of controlling and governing the rake-teeth instantly during the progress of raking without changing the position of the adjusting-lever, so as to adapt the rake thereby to unevenness of the ground, and increase the facility and efficacy of working the same.

My invention consists of an independent shifting-lever, interposed between the regular teeth-setting lever mechanism and the pivoted tooth-bar.

In the drawing, A represents the supporting-frame of a horse hay-rake; B, the tooth-bar, arranged in the usual manner at the rear part of the frame; and C, the setting or regulating lever, which is placed into a notched arc or rack, C', in the usual manner, for securing the rake-teeth in the required position. The shaft or pivot pin $a$ of the setting-lever C is provided with a crank, $b$, parallel to the same, on which is loosely placed an intermediate shifting-lever, D, having a handle part, D', the lever being pivoted, at some distance from the shaft, to connecting rods or links $d$, which are again pivoted to a curved arm, $e$, of the tooth-bar B.

When the intermediate lever D D is pressed down on the tooth-bar connecting-rods, so as to form one straight line therewith, the regulating-lever may be moved in forward or backward direction for raising or lowering the rake-teeth, according as the same are to be taken from the ground or employed thereon for raking.

Whenever it is found necessary that the teeth should be suddenly and abruptly raised—as, for instance, when one wheel moves in a low spot or dead furrow, so that the teeth dig up the ground and pick up dirt and trash, getting also injured or broken—the action of the regulating-lever would be too slow and tedious, while the intermediate lever serves fully this purpose, as the teeth may therewith be, without loss of time, placed into the position required to rake clean and be protected.

The setting-lever is only used for the starting and disconnecting of the work of the rake, the shifting-lever being employed for all sudden interruptions, so as to save time and trouble, and produce a more perfect and satisfactory raking.

Having thus described my invention, I claim as new and desire to secure by Letters Patent—

The combination of the setting-lever C, notched arc C', and arms $b\,e$ with the shifting-lever D D' and connecting-bar $d$, substantially as and for the purpose specified.

PETER MAST.

Witnesses:
 JOHN B. LITTY,
 JOHN W. ROOP.